US012589380B2

US 12,589,380 B2

(12) United States Patent
Matsumoto et al.

(10) Patent No.: US 12,589,380 B2
(45) Date of Patent: Mar. 31, 2026

(54) PRODUCING METHOD OF GRANULATED BODY FOR LITHIUM ADSORPTION

(71) Applicant: SUMITOMO METAL MINING CO., LTD., Tokyo (JP)

(72) Inventors: Shin-ya Matsumoto, Niihama (JP); Yohei Kudo, Niihama (JP); Masatoshi Takano, Niihama (JP); Shin-ichi Heguri, Niihama (JP); Satoshi Asano, Niihama (JP)

(73) Assignee: SUMITOMO METAL MINING., LTD., Tokyo (JP)

( * ) Notice: Subject to any disclaimer, the term of this patent is extended or adjusted under 35 U.S.C. 154(b) by 576 days.

(21) Appl. No.: 18/007,704

(22) PCT Filed: Jun. 16, 2022

(86) PCT No.: PCT/JP2022/024110

§ 371 (c)(1),
(2) Date: Dec. 1, 2022

(87) PCT Pub. No.: WO2023/276697

PCT Pub. Date: Jan. 5, 2023

(65) Prior Publication Data

US 2024/0238760 A1 Jul. 18, 2024

(30) Foreign Application Priority Data

Jun. 30, 2021 (JP) ................................. 2021-108664

(51) Int. Cl.
B01J 20/30 (2006.01)

(52) U.S. Cl.
CPC ....... B01J 20/3078 (2013.01); B01J 20/3014 (2013.01); B01J 20/3028 (2013.01)

(58) Field of Classification Search
CPC .......................... B01J 20/3014; B01J 20/3028; B01J 20/3042; B01J 20/3078
(Continued)

(56) References Cited

U.S. PATENT DOCUMENTS 6,342,191 B1 * 1/2002 Kepner ...................... B01J 3/00
502/247
10,786,802 B2 * 9/2020 Boualleg ................. C01F 7/782
(Continued)

FOREIGN PATENT DOCUMENTS

JP 2020-097011 A 6/2020
WO 2011/058841 A1 5/2011
(Continued)

OTHER PUBLICATIONS

W. Tang; "Development of System of Collecting Lithium from Brine Water"; Kagawa Industry Support Foundation; accessed Jun. 16, 2022; https://www.kagawa-isf.jp/wp-content/uploads/2022/02/21tang.pdf (4 sheets, 7 sheets translation, 11 sheets total).

*Primary Examiner* — Cam N. Nguyen
(74) *Attorney, Agent, or Firm* — Kratz, Quintos & Hanson, LLP

(57) ABSTRACT

A producing method of granulated body for lithium adsorption that allows sufficiently suppressing a manganese elution in an eluting step when producing lithium on a commercial basis, includes a kneading step of kneading a powder of a lithium adsorbent precursor and a binder to obtain a kneaded product, a granulating step of granulating the kneaded product to obtain a 1st granulated body, and a sintering step of sintering the 1st granulated body to obtain a 2nd granulated body. The configuration allows a manganese valence contained in the lithium adsorbent precursor to change from 2 to 4, and thus allowing the suppressed manganese elution in the eluting step. Further, in production on a commercial basis, the lithium adsorbent can be used repeatedly. In
(Continued)

LITHIUM ADSORBENT PRECURSOR   ALUMINA SOL BINDER

KNEADING STEP

KNEADED PRODUCT

GRANULATING STEP

1st GRANULATED BODY

SINTERING STEP

2nd GRANULATED BODY (GRANULATED BODY FOR LITHIUM ADSORPTION)

addition, a manganese concentration in an eluent obtained in the eluting step can be suppressed, thus allowing loads in steps after the eluting step to be reduced.

4 Claims, 2 Drawing Sheets

(58) Field of Classification Search
USPC ......................................................... 502/400
See application file for complete search history.

(56) References Cited

U.S. PATENT DOCUMENTS

| | | | | |
|---|---|---|---|---|
| 11,260,366 | B2 * | 3/2022 | Kudryavtsev | ........ B01J 20/3021 |
| 11,559,783 | B2 * | 1/2023 | Lecocq | .................... B01J 39/10 |
| 12,090,464 | B2 * | 9/2024 | Takano | .................. C01G 45/00 |
| 2014/0210122 | A1 | 7/2014 | Chung | |
| 2016/0317998 | A1 * | 11/2016 | Boualleg | .............. B01J 20/3078 |
| 2017/0043317 | A1 * | 2/2017 | Boualleg | ................ C01D 15/04 |
| 2020/0391177 | A1 | 12/2020 | Takano | |
| 2022/0024776 | A1 | 1/2022 | Takano | |

FOREIGN PATENT DOCUMENTS

| | | | |
|---|---|---|---|
| WO | 2019/203274 | A1 | 10/2019 |
| WO | 2020/116607 | A1 | 6/2020 |

* cited by examiner

PRODUCING METHOD OF GRANULATED BODY FOR LITHIUM ADSORPTION

BACKGROUND

1. Technical Field

The present invention relates to a producing method of granulated body for lithium adsorption. More particularly, the present invention relates to a producing method of granulated body for lithium adsorption containing a lithium adsorbent precursor.

2. Related Art

TANG Weiping, (11 Jun. 2010), "Development of System of Collecting Lithium from Brine Water", Kagawa Industry Support Foundation, accessed 16 Jun. 2022, <https://www.kagawa-isf.jp/wp-content/uploads/2022/02/21tang.pdf> discloses a system of collecting lithium from brine water. This document discloses a process of adsorbing lithium from brine water using a lithium adsorbent, and removing the adsorbed lithium to generate high purity $Li_2CO_3$.

Further, WO 2019/203274 discloses a producing method of a lithium adsorbent precursor that selectively adsorbs lithium. According to this producing method, lithium manganese oxide is obtained under atmospheric pressure as a lithium adsorbent precursor. WO 2020/116607 discloses a producing method of a lithium-containing solution using the above described lithium manganese oxide. According to this producing method, manganese elution in an eluting step of eluting lithium from a lithium adsorbent can be suppressed.

SUMMARY

The suppression of manganese elution in WO 2020/116607 is performed by determining an acid concentration of an acid solution in the eluting step. Nevertheless, when attempting to perform the producing method in WO 2020/116607 on a commercial basis, the concentration of the acid concentration in the entire solution is difficult to be kept uniform, and thus, the suppression of manganese elution may possibly be insufficient.

In view of the above circumstances, an object of the present invention is to provide a producing method of granulated body for lithium adsorption that allows sufficiently suppressing the manganese elution in the eluting step when producing lithium on a commercial basis.

Solutions to the Problems

A producing method of granulated body for lithium adsorption of a 1st invention includes a kneading step of kneading a powder of a lithium adsorbent precursor and a binder to obtain a kneaded product, a granulating step of granulating the kneaded product to obtain a 1st granulated body, and a sintering step of sintering the 1st granulated body to obtain a 2nd granulated body.

In a producing method of granulated body for lithium adsorption of a 2nd invention, which is in the 1st invention, a sintering temperature of the sintering step is 520° C. or more and 600° C. or less.

Effects of the Invention

According to the 1st invention, since the sintering step of sintering the 1st granulated body is provided after the kneading step and the granulating step, a manganese valence contained in the lithium adsorbent precursor can be changed from 2 to 4. In the lithium adsorbent precursor, it has been believed that a divalent manganese would remain without becoming tetravalent, and the divalent manganese would elute in the eluting step. However, due to the sintering step being provided, most of the divalent manganese change to tetravalent manganese. The tetravalent manganese is less likely to dissolve in water, and thus the manganese elution in the eluting step can be suppressed. Therefore, in production on a commercial basis, the lithium adsorbent can be used repeatedly. In addition, by using the granulated body for lithium adsorption of this application in the eluting step, a manganese concentration in an eluent obtained in the eluting step can be suppressed, thus allowing loads in steps after the eluting step to be reduced.

According to the 2nd invention, since a sintering temperature of the sintering step is 520° C. or more and 600° C. or less, the divalent manganese can be further allowed to become the tetravalent manganese, allowing the manganese elution to be further suppressed.

DETAILED DESCRIPTION

Hereinafter, the embodiment of the present invention is described based on the drawings. However, the following embodiment exemplifies the producing method of granulated body for lithium adsorption for realization of the technical idea of the present invention, and thus the present invention does not intend to limit the producing method of granulated body for lithium adsorption to the following method.

The producing method of granulated body for lithium adsorption according to the present invention includes a kneading step of kneading a powder of a lithium adsorbent precursor and a binder to obtain a kneaded product, a granulating step of granulating the kneaded product to obtain a 1st granulated body, and a sintering step of sintering the 1st granulated body to obtain a 2nd granulated body.

In the producing method of granulated body for lithium adsorption, since the sintering step of sintering the 1st granulated body is provided after the kneading step and the granulating step, a manganese valence contained in the lithium adsorbent precursor can be changed from 2 to 4. In the lithium adsorbent precursor, it has been believed that a divalent manganese would remain without becoming tetravalent, and the divalent manganese would elute in the eluting step. However, due to the sintering step being provided, most of the divalent manganese change to tetravalent manganese. The tetravalent manganese is less likely to dissolve in water, and thus the manganese elution in the eluting step can be suppressed. Therefore, in production on a commercial basis, the lithium adsorbent can be used repeatedly. In addition, by using the granulated body for lithium adsorption of this application in the eluting step, a manganese concentration in an eluent obtained in the eluting step can be suppressed, thus allowing loads in steps after the eluting step to be reduced.

Further, in the producing method of granulated body for lithium adsorption according to the present invention, a sintering temperature of the sintering step is 520° C. or more and 600° C. or less. Since the sintering temperature of the sintering step is 520° C. or more and 600° C. or less, the divalent manganese can be further allowed to become the tetravalent manganese, allowing the manganese elution to be further suppressed.

Embodiment (Lithium Adsorbent Precursor)

Figure 1:
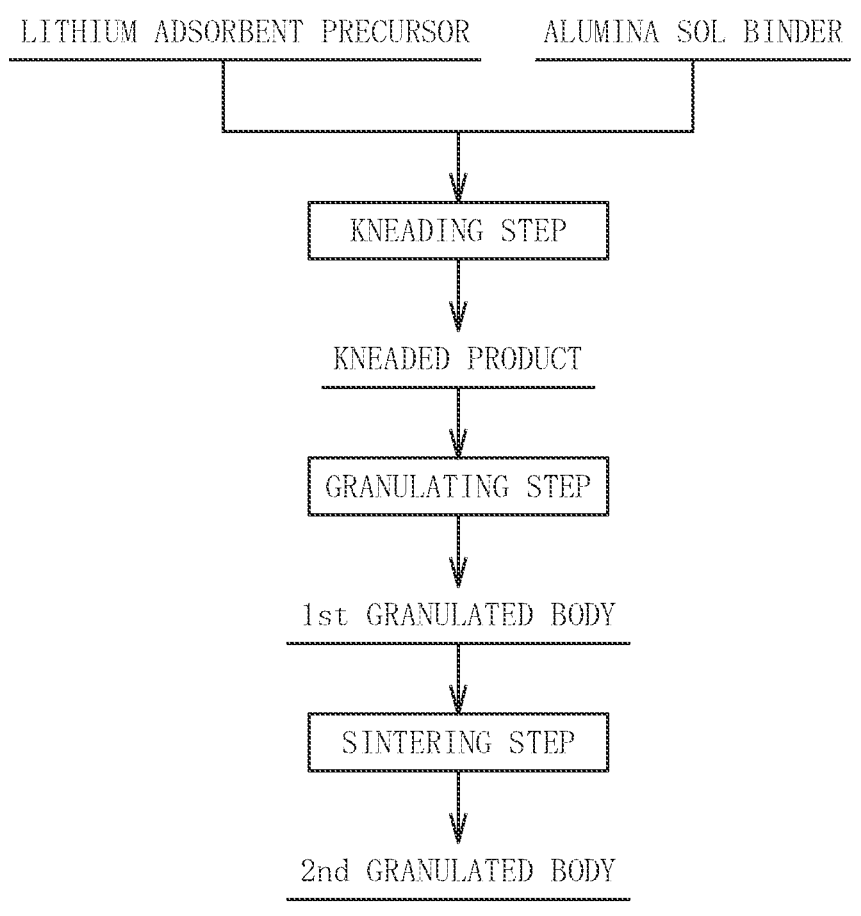
FIG. 1 is a flowchart of a producing method of granulated body for lithium adsorption according to an embodiment of this invention.

In the kneading step, a powder of the lithium adsorbent precursor and a binder are kneaded to obtain a kneaded product. The lithium adsorbent precursor used in the kneading step is described below. Note that FIG. 1 illustrates a flowchart of the producing method of granulated body for lithium adsorption according to one embodiment of the present invention. The lithium adsorbent precursor is used in the kneading step.

The lithium adsorbent is not particularly limited as long as it selectively adsorbs lithium from a lithium-containing solution. Examples of the lithium adsorbent may include, for example, $H_{1.6}Mn_{1.6}O_4$, $H_{1.33}Mn_{1.67}O_4$, and the like obtained from lithium manganese oxide. The lithium adsorbent can be obtained by replacing Li with hydrogen in $Li_{1.6}Mn_{1.6}O_4$ and $Li_{1.33}Mn_{1.67}O_4$, which are the lithium adsorbent precursors, as shown in Formula 1 and 2.

$$Li_{1.6}Mn_{1.6}O_4 + 1.6HCl \rightarrow H_{1.6}Mn_{1.6}O_4 + 1.6LiCl \qquad \text{[Formula 1]}$$

$$Li_{1.33}Mn_{1.67}O_4 + 1.33HCl \rightarrow H_{1.33}Mn_{1.67}O_4 + 1.33LiCl \qquad \text{[Formula 2]}$$

(Kneading Step)

FIG. 1 illustrates a flowchart of the producing method of lithium-containing solution according to one embodiment of the present invention. When realizing the producing method of obtaining lithium-containing solution containing lithium from the lithium adsorbent on a commercial basis, a method of making the lithium adsorbent into a granular form to be housed in a predetermined container, and passing an acid solution such as hydrochloric acid through the container is most appropriate. In this case, the lithium adsorbent precursor needs to be made into a granular form. The present invention relates to a producing method of obtaining granulated body for lithium adsorption from the lithium adsorbent precursor.

The producing method of granulated body for lithium adsorption according to the embodiment includes a kneading step. In the kneading step, the powder of the lithium adsorbent precursor and the binder are kneaded to obtain the kneaded product. Here, examples of the binder may include: an inorganic binder, such as silica sol, alumina sol, zirconia sol, calcium oxide, silicon dioxide, calcium silicate, calcium sulfate, and calcium hydroxide; a clay-based binder, such as bentonite and kaolinite; a cellulose-based binder, such as carboxymethyl cellulose and hydroxyethyl cellulose; and a high-molecular binder, such as polyethylene glycol and polyethylene oxide. In this embodiment, alumina sol is preferably used. Alumina sol is a colloid solution of an alumina hydrate using water as a dispersion medium, and includes, for example, Cataloid AP-1 (JGC Catalysts and Chemicals Ltd.). A proportion of the lithium adsorbent precursor and the alumina sol is, for example, a weight ratio of 4:1. As a solvent, various kinds of aqueous solvents or organic solvents can be used.

(Granulating Step)

As illustrated in FIG. 1, in the granulating step, the kneaded product obtained in the kneading step is performed to obtain the $1^{st}$ granulated body. Although a size of the $1^{st}$ granulated body is not particularly limited, a granular body having a grain size of 0.5 mm or more and 2 mm or less is especially preferred. In a case where the $1^{st}$ granulated body is a granular body having a grain size of 0.5 mm or more, when the container is filled with the adsorbent of the present invention and water is passed through the container, the grains are less likely to clog an inside of the container, and thus an increase of a pressure drop inside the container can be suppressed. In addition, while a case where a grain diameter is larger than 2 mm causes an adsorption speed of the lithium to slow down and an adsorption efficiency to decline, by making the grain diameter 2 mm or less, an adsorption performance can be improved. Example of the granulating step can employ an agitation and mixing granulation, a tumbling granulation, an extrusion granulation, a crushing granulation, a fluidized bed granulation, a spray-drying granulation (spray drying), or a compression granulation. The grain size of the granulated body according to the embodiment can be confirmed to be in a determined range specifically by using a sieve having an aperture size corresponding to each grain size according to JIS Z 8801.

(Sintering Step)

As illustrated in FIG. 1, in the sintering step, the $1^{st}$ granulated body obtained in the granulating step is sintered to obtain the $2^{nd}$ granulated body. The $1^{st}$ granulated body is sintered, for example, by being retained at a preliminarily determined temperature for a preliminarily determined time period in an electric furnace to become the $2^{nd}$ granulated body.

The temperature is preferably 450° C. or more and 800° C. or less, and more preferably, 520° C. or more and 600° C. or less. A retention time is preferably 4 hours or more and 6 hours or less.

EXAMPLES

Hereinafter, specific examples of the producing method of granulated body for lithium adsorption according to the present invention will be further described in detail, but the present invention is not limited by these examples.

Example 1

As the binder for granulating lithium manganese oxide that is the lithium adsorbent precursor, alumina sol (Cataloid AP-1 (JGC Catalysts and Chemicals Ltd.)) was used. The binder was kneaded with the powder of the lithium adsorbent precursor ($Li_{1.6}Mn_{1.6}O_4$) so as to account for 20% of an overall weight (kneading step), and granulated to obtain the $1^{st}$ granulated body (granulating step). The $1^{st}$ granulated body was sintered for 5 hours at 450° C. using the electric furnace to obtain the $2^{nd}$ granulated body, that is, the granulated body for lithium adsorption (sintering step). A glass column was loaded with the obtained $2^{nd}$ granulated body, and after the lithium adsorbent precursor ($Li_{1.6}Mn_{1.6}O_4$) was turned into the lithium adsorbent ($H_{1.6}Mn_{1.6}O_4$), the adsorbing step and the eluting step were performed to obtain the lithium-containing solution. In Examples, an amount of manganese in the obtained lithium-containing solution was measured to confirm whether or not the amount of manganese was within a predetermined range. Specifically, in the eluting step, the acid solution passed through the column up to BV10 (BV is an abbreviation for Bed Volume, which is a unit representing how many times the volume of the acid solution that has passed through the column is the volume of the lithium adsorbent in the column), and then the manganese concentration of every BV1 was measured. A sum of the amount of manganese eluted from BV1 to BV10 was divided by a weight of the loaded granulated body to calculate a manganese elution amount per 1 gram of the granulated body. The manganese elution amount is shown in Table 1 and FIG. 2.

Example 2

Parameters in Example 2 are the same as those in Example 1 except that the temperature of the sintering step was set at 500° C. A manganese elution amount of Example 2 is shown in Table 1 and FIG. 2.

Example 3

Parameters in Example 3 are the same as those in Example 1 except that the temperature of the sintering step was set at 520° C. A manganese elution amount of Example 3 is shown in Table 1 and FIG. 2.

Example 4

Parameters in Example 4 are the same as those in Example 1 except that the temperature of the sintering step was set at 550° C. A manganese elution amount of Example 4 is shown in Table 1 and FIG. 2.

Example 5

Parameters in Example 5 are the same as those in Example 1 except that the temperature of the sintering step was set at 600° C. A manganese elution amount of Example 5 is shown in Table 1 and FIG. 2.

Example 6

Parameters in Example 6 are the same as those in Example 1 except that the temperature of the sintering step was set at 700° C. A manganese elution amount of Example 6 is shown in Table 1 and FIG. 2.

Example 7

Parameters in Example 7 are the same as those in Example 1 except that the temperature of the sintering step was set at 800° C. A manganese elution amount of Example 7 is shown in Table 1 and FIG. 2.

TABLE 1

| Sintering temperature | ° C. | 450 | 500 | 520 | 550 | 600 | 700 | 800 |
|---|---|---|---|---|---|---|---|---|
| Manganese elution amount | mg/g | 10 | 8.5 | 7 | 6.4 | 6.6 | 7.9 | 10.1 |

Figure 2:
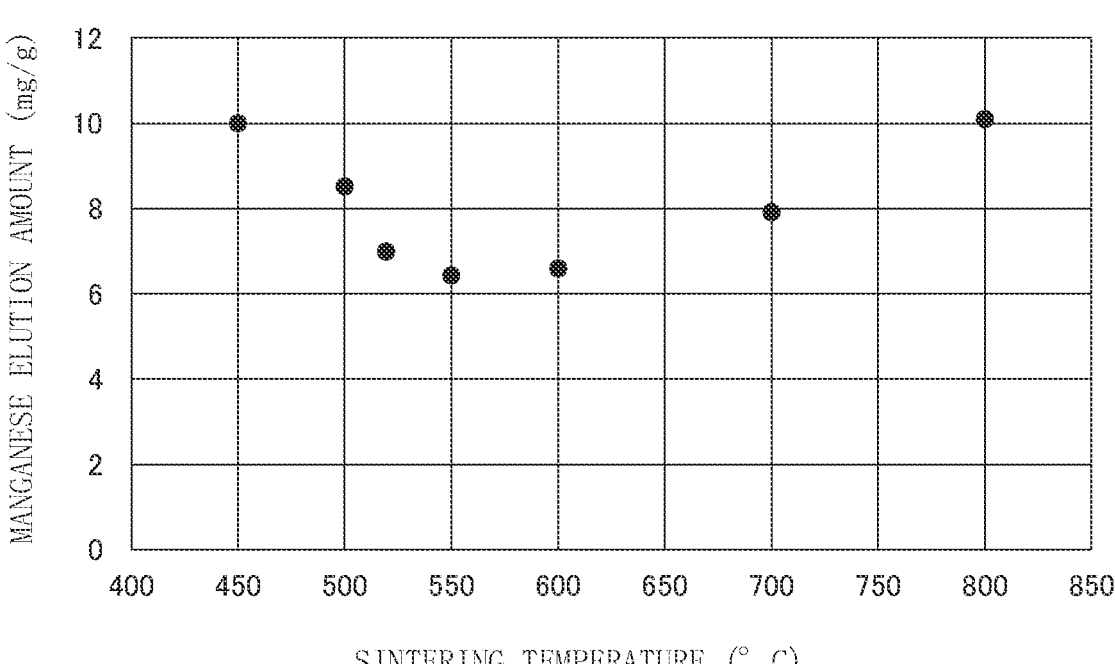
FIG. 2 is a graph indicating a relation between a sintering temperature and a manganese elution amount.

As indicated in Table 1 and FIG. 2, since the producing method of granulated body for lithium adsorption includes the sintering step, the divalent manganese included in the lithium adsorbent precursor can be changed to a tetravalent manganese, and thus the manganese elution amount can be suppressed. The temperature of the sintering step is preferably 450° C. or more and 800° C. or less, and more preferably, 520° C. or more and 600° C. or less. The retention time can be understood to be preferably 4 hours or more and 6 hours or less.

What is claimed is:

1. A method for producing a granulated body for lithium adsorption, comprising:
   a kneading step of kneading a powder of a lithium adsorbent precursor and a binder to obtain a kneaded product;
   a granulating step of granulating the kneaded product to obtain a 1st granulated body; and
   a sintering step of sintering the 1st granulated body to obtain a 2nd granulated body, wherein
   a sintering temperature of the sintering step is 520° C. or more and 600° C. or less, and
   a retention time of the sintering temperature is 4 hours or more and 6 hours or less.

2. The method for producing the granulated body for lithium adsorption according to claim 1, wherein
   the lithium adsorbent precursor is $Li_{1.6}Mn_{1.6}O_4$ or $Li_{1.33}Mn_{1.67}O_4$.

3. The method for producing the granulated body for lithium adsorption according to claim 1, wherein
   the binder is selected from the group consisting of silica sol, alumina sol, zirconia sol, calcium oxide, silicon dioxide, calcium silicate, calcium sulfate, calcium hydroxide, bentonite, kaolinite, carboxymethyl cellulose, hydroxyethyl cellulose, polyethylene glycol and polyethylene oxide.

4. The method for producing the granulated body for lithium adsorption according to claim 1, wherein the lithium adsorbent precursor is a substance that becomes a lithium adsorbent by replacing Li with hydrogen from the lithium adsorbent precursor, and the lithium adsorbent is a substance that can selectively adsorb lithium.

\* \* \* \* \*